US011795263B2

United States Patent
Spyrou et al.

(10) Patent No.: US 11,795,263 B2
(45) Date of Patent: Oct. 24, 2023

(54) LOW-WATER-CONTENT HYDROPHILIZATION AGENTS AND USE THEREOF IN AQUEOUS DISPERSIONS

(71) Applicant: Evonik Operations GmbH, Essen (DE)

(72) Inventors: Emmanouil Spyrou, Schermbeck (DE); Iris Brückner, Dorsten (DE); Judith Schoder, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 673 days.

(21) Appl. No.: 16/705,480

(22) Filed: Dec. 6, 2019

(65) Prior Publication Data

US 2020/0190248 A1 Jun. 18, 2020

(30) Foreign Application Priority Data

Dec. 13, 2018 (EP) .................................. 18212237

(51) Int. Cl.
| | |
|---|---|
| *C08G 18/66* | (2006.01) |
| *C08G 18/38* | (2006.01) |
| *C08G 18/32* | (2006.01) |
| *C08G 18/75* | (2006.01) |
| *C09D 175/12* | (2006.01) |
| *C09J 175/12* | (2006.01) |
| *C09K 3/10* | (2006.01) |
| *C08G 18/24* | (2006.01) |
| *C08G 18/08* | (2006.01) |

(52) U.S. Cl.
CPC ..... *C08G 18/3857* (2013.01); *C08G 18/0828* (2013.01); *C08G 18/246* (2013.01); *C08G 18/3206* (2013.01); *C08G 18/3228* (2013.01); *C08G 18/3275* (2013.01); *C08G 18/664* (2013.01); *C08G 18/6644* (2013.01); *C08G 18/6648* (2013.01); *C08G 18/755* (2013.01); *C09D 175/12* (2013.01); *C09J 175/12* (2013.01); *C09K 3/1021* (2013.01); *C09K 2200/065* (2013.01)

(58) Field of Classification Search
CPC .............. C08G 18/0828; C08G 18/246; C08G 18/3206; C08G 18/3228; C08G 18/3275; C08G 18/3857; C08G 18/664; C08G 18/6644; C08G 18/6648; C09K 3/1021
See application file for complete search history.

(56) References Cited

U.S. PATENT DOCUMENTS

| | | | |
|---|---|---|---|
| 3,479,310 A | | 11/1969 | Dietrich et al. |
| 4,956,438 A | * | 9/1990 | Ruetman ............ C08G 18/4812 528/65 |
| 8,197,835 B2 | | 6/2012 | Dietze et al. |
| 8,629,195 B2 | | 1/2014 | Schoenberger et al. |
| 10,093,765 B2 | | 10/2018 | Stache et al. |
| 10,093,826 B2 | | 10/2018 | Stache et al. |
| 2004/0197293 A1 | * | 10/2004 | Mougin ................... A61Q 5/06 528/68 |
| 2007/0249746 A1 | | 10/2007 | Rische et al. |
| 2007/0270730 A1 | | 11/2007 | Rische et al. |
| 2009/0099082 A1 | | 4/2009 | Schoenberger et al. |
| 2015/0080352 A1 | | 3/2015 | Viala et al. |
| 2018/0155515 A1 | | 6/2018 | Spyrou et al. |
| 2018/0327538 A1 | | 11/2018 | Lomölder et al. |
| 2019/0300549 A1 | | 10/2019 | Kreczinski et al. |
| 2019/0300550 A1 | | 10/2019 | Kreczinski et al. |
| 2019/0300551 A1 | | 10/2019 | Kreczinski et al. |
| 2019/0300553 A1 | | 10/2019 | Kreczinski et al. |
| 2019/0322793 A1 | * | 10/2019 | Ji ....................... C08G 18/0823 |
| 2019/0352449 A1 | | 11/2019 | Spyrou et al. |
| 2019/0352450 A1 | | 11/2019 | Spyrou et al. |
| 2019/0352451 A1 | | 11/2019 | Spyrou et al. |
| 2019/0352452 A1 | | 11/2019 | Spyrou et al. |

FOREIGN PATENT DOCUMENTS

| | | | | |
|---|---|---|---|---|
| CN | 108752552 A | * | 11/2018 | ......... C08G 18/0823 |
| DE | 14 95 847 A1 | | 5/1969 | |
| DE | 14 95 745 A1 | | 6/1969 | |
| EP | 2 045 278 A1 | | 4/2009 | |
| GB | 1076688 | | 7/1967 | |
| JP | 2009 040865 A | | 2/2009 | |
| WO | WO-0174921 A1 | * | 10/2001 | ......... C08G 18/0828 |
| WO | 2018/095967 A1 | | 5/2018 | |

OTHER PUBLICATIONS

CN-108752552-A_11-2018_English Translation.*
European Search Report dated Apr. 24, 2020 in EP 19213833.7 (10 pages).
Unlekhaußer et al., U.S. Appl. No. 16/410,082, filed May 13, 2019.
Spyrou et al., U.S. Appl. No. 16/684,942, filed Nov. 15, 2019.
Spyrou et al. U.S. Appl. No. 16/684,969, filed Nov. 15, 2019.

* cited by examiner

*Primary Examiner* — Michael L Leonard
(74) *Attorney, Agent, or Firm* — Michael Best & Friedrich LLP

(57) ABSTRACT

The present invention relates to compositions comprising a) 20-80% by weight, based on the total mass of constituents of the composition, of at least one sulfonic acid functionalized with at least one hydroxy and/or amino group and/or at least one sulfonic acid derivative functionalized with at least one hydroxy and/or amino group and b) 80-20% by weight, based on the total mass of constituents of the composition, of at least one compound having at least two OH groups, a method for the preparation thereof and use thereof.

12 Claims, No Drawings

LOW-WATER-CONTENT HYDROPHILIZATION AGENTS AND USE THEREOF IN AQUEOUS DISPERSIONS

CROSS REFERENCE TO RELATED APPLICATIONS

This application is a 35 U.S.C. § 119 patent application which claims the benefit of European Application No. 18212237.4 filed Dec. 13, 2018, which is incorporated herein by reference in its entirety.

FIELD

Aqueous dispersions have in recent decades become ever more important in the field of coatings, adhesives, sealants and plastics. There are many reasons for this: ease of use, good performance, low to no toxicity and, of course, the possibility of avoiding organic solvents.

BACKGROUND

In order to dissolve or disperse organic binders in aqueous systems, it is necessary to use emulsifiers. Preference is given to incorporable emulsifiers, so-called hydrophilizing agents. Among the best known is dimethylolpropionic acid (DMPA). After incorporation, this is neutralized with amines or alkali metal salts. A disadvantage of the use of DMPA is that large amounts are needed for a hydrophilizing effect, which adversely affect binder properties.

Sulfonic acids and sulfonic acid derivatives (for example sodium 2-[(2-aminoethyl)amino]ethanesulfonate, which is commercially available under the trade name Vestamin A95 from Evonik Industries AG) achieve the same effect. However, only small amounts of these substances are needed. A disadvantage, however, is that sulfonic acids and sulfonic acid derivatives are generally used dissolved in water on account of their high hydrophilicity. However, this counters their intended effect, because the initially unhydrophilized binder must first be laboriously emulsified in water. Although auxiliary solvents such as esterified ethers (for example CN 106366291 A) or acetone may be used, their use is contrary to the objective of aqueous dispersions and they need to be laboriously removed afterwards.

WO 2018/095967 A1 (directed at processes for the production of coated objects, wherein coating may be carried out using a PU dispersion), EP 2045278 A1 (directed at processes using PU dispersions for the production of foamed articles, in particular wound dressings), US 2015/0080352 A1 (directed at aqueous PU dispersions and the use thereof in the treatment of acne) and US 2007/0249746 A1 (directed at processes for the production of microporous coatings that use PU dispersions) disclose polyurethane dispersions that can be produced inter alia using mixtures comprising sulfonic acid salts and diamines or hydroxylamines. However, amino groups have the disadvantage of forming urea groups and increasing the viscosity of the prepolymer disadvantageously through this.

SUMMARY

The object of the invention was thus to provide hydrophilizing agents based on sulfonic acids or sulfonic acid derivatives that may be used without disadvantageous addition of water, organic solvents, or amino-group-containing compounds to the organic binder.

DETAILED DESCRIPTION

The present invention provides compositions comprising
a) 20-80% by weight of at least one sulfonic acid functionalized with at least one hydroxy and/or amino group and/or at least one sulfonic acid derivative functionalized with at least one hydroxy and/or amino group and
b) 80-20% by weight of at least one compound having at least two OH groups. The percentages by weight here and below refer to the total mass of constituents of the composition.

The compositions according to the invention are particularly suitable for water-free and solvent-free hydrophilization of binders, in particular for isocyanate-containing binders. Most preferably, the composition according to the invention is suitable for hydrophilizing polyurethane dispersions.

The present invention thus preferably provides corresponding hydrophilizing agents comprising a) 20-80% by weight of at least one sulfonic acid functionalized with at least one hydroxy and/or amino group and/or at least one sulfonic acid derivative functionalized with at least one hydroxy and/or amino group and b) 80-20% by weight of at least one compound having at least two OH groups.

In addition to a sulfonic acid and/or sulfonic acid derivative and a compound having at least two OH groups, the compositions and hydrophilizing agents according to the invention may in principle include further reactive constituents and solvents. It is, however, preferable for the compositions/hydrophilizing agents according to the invention to consist of said two reactive constituents. Moreover, solvents (including water) may in principle be present. However, there is preferably not more than 5% by weight of solvents present, since particularly good effects are achieved therewith. More preferably, the solvent present at not more than 5% by weight is water. Even more preferably, the composition is water-free. In another preferred embodiment, the water content is 0.5-5% by weight, more preferably 1-4% by weight, even more preferably 2-4% by weight.

Preferably, the composition a) comprises 35-65% by weight of at least one sulfonic acid and/or one sulfonic acid derivative and b) 65-35% by weight of at least one compound having at least two OH groups. Even more preferably, since particularly good effects are achieved therewith, the composition comprises a) 40-60% by weight of at least one sulfonic acid and/or one sulfonic acid derivative and b) 60-40% by weight of at least one compound having at least two OH groups.

The composition according to the invention preferably comprises a sulfonic acid derivative, more preferably a sulfonic acid salt. Even more preferably, the sulfonic acid salt is a lithium, sodium, potassium or caesium salt of a sulfonic acid selected from the group consisting of hydroxyethylsulfonic acid, hydroxypropylsulfonic acid, hydroxybutylsulfonic acid, aminoethylsulfonic acid, aminopropylsulfonic acid, aminobutylsulfonic acid and 2-[(2-aminoethyl)aminoethane]sulfonic acid. Most preferred is the sodium salt of 2-[(2-aminoethyl)aminoethane]sulfonic acid (principal constituent of the commercial product Vestamin A95 from Evonik Industries AG).

The composition according to the invention most preferably comprises exclusively a sulfonic acid derivative, more preferably exclusively a sulfonic acid salt, i.e. the composition comprises 20-80% by weight of at least one sulfonic acid derivative or sulfonic acid salt and no sulfonic acid.

The compound having at least two OH groups is a polyol (compounds having at least two OH groups).

Polyols that may be used are in principle all monomeric or polymeric substances that have at least two hydroxy groups. Preference is given to ethylene glycol, propylene glycol, butanediol, propanediol, hexanediol, trimethylolpropane, glycerol, polyether polyols (in particular polyethylene glycol and polypropylene glycol), and polycaprolactone polyols. Preferred polyether polyols and polycaprolactone polyols are the following commercially available polycaprolactone polyols ("Capa" name products) and polyether polyols (all others) and:

|  | OH value (approx.) | Molar mass | Manufacturer |
| --- | --- | --- | --- |
| Polyol 3165 | 1010 | 165 | Perstorp |
| Polyol 3380 | 380 | 440 | Perstorp |
| Polyol 3610 | 610 | 280 | Perstorp |
| Polyol 3940 | 940 | 180 | Perstorp |
| Polyol 3990 | 990 | 170 | Perstorp |
| Polyol 4290 | 290 | 800 | Perstorp |
| Polyol 4360 | 360 | 630 | Perstorp |
| Polyol 4525 | 525 | 430 | Perstorp |
| Polyol 4640 | 640 | 360 | Perstorp |
| Polyol 4800 | 800 | 280 | Perstorp |
| Polyol R3215 | 215 | 1010 | Perstorp |
| Polyol R3430 | 430 | 400 | Perstorp |
| Polyol R3530 | 530 | 310 | Perstorp |
| Polyol R3540 | 540 | 310 | Perstorp |
| Polyol R3610 | 610 | 280 | Perstorp |
| Polyol R4631 | 630 | 280 | Perstorp |
| Polyol R6405 | 405 | 830 | Perstorp |
| Voranol CP 260 | 660 | 255 | Dow |
| Voranol CP 300 | 565 | 300 | Dow |
| Voranol CP 450 | 380 | 450 | Dow |
| Voranol CP 755 | 240 | 700 | Dow |
| Voranol CP 1055 | 155 | 1000 | Dow |
| Voranol RH 360 | 360 | 700 | Dow |
| Voranol RN 490 | 490 | 490 | Dow |
| Voranol RA 640 | 640 | 350 | Dow |
| Voranol RA 800 | 800 | 280 | Dow |
| Terathane 650 | 170 | 650 | DuPont |
| Terathane 1000 | 100 | 1000 | DuPont |
| Capa 3031 | 560 | 300 | Perstorp |
| Capa 3041 | 395 | 425 | Perstorp |
| Capa 3050 | 310 | 540 | Perstorp |
| Capa 3091 | 180 | 900 | Perstorp |
| Capa 4101 | 220 | 1000 | Perstorp. |

The preferred weight-average molar mass of the polyols is between 62 and 1000 g/mol and/or the preferred functionality is between 2 and 6.

The water content of the compositions, hydrophilizing agent and polyurethane dispersion according to the invention is preferably less than 5% by weight, based on the total mass of the composition, more preferably less than 1% by weight, even more preferably less than 0.5% by weight.

The composition/hydrophilizing agent comprising a low-water-content sulfonic acid derivative and polyol can be easily prepared. The invention thus likewise provides a method for preparing the inventive compositions/hydrophilizing agents, in which the sulfonic acid or sulfonic acid derivative is mixed with the compound having at least two OH groups. One option for preparing the composition/hydrophilizing agent is to dissolve the sulfonic acid derivative in the polyol at room temperature or, if necessary, at higher temperatures in a suitable stirred apparatus.

In the event that the sulfonic acid or sulfonic acid derivative is supplied in water, it must be dried before use. If the sulfonic acid derivative is supplied in water, the water may first be removed, preferably under reduced pressure, in a suitable distillation apparatus, for example in a distillation column or in a short-path or thin-film evaporator at temperatures between RT and 100° C. Simple oven-drying may also be considered. Once all or most of the water has been removed from the sulfonic acid derivative, the method may be continued as described above in order to bring about mixing with the polyols or polyamines.

Alternatively, the polyol may first be added to the water-containing sulfonic acid derivative in order to then remove the water by distillation as described above. This has the advantage that the composition remains liquid at all stages and is therefore easier to process.

For the preparation of the likewise inventive compositions/binder dispersions, the individual components in accordance with the teaching of DE 14 95 745 A1 and DE 14 95 847 A1, isocyanates and polyols are reacted with the inventive hydrophilizing mixture, optionally in a suitable anhydrous solvent. This may optionally take place at elevated temperature and/or in the presence of known polyurethane catalysts. Once the reaction is complete, any solvent present is removed, this NCO-containing PUR prepolymer is brought into contact with water and dispersed by vigorous stirring. Before, during or after the addition of water it is usual to add a chain extender, which is normally a short-chain diamine or amino alcohol.

The invention also provides the use of the inventive composition for hydrophilizing binders for aqueous dispersions, in particular for isocyanate-containing binders.

EXPERIMENTAL

1) Preparation of the Mixtures According to the Invention 100 g amounts of Vestamin A95 (Evonik Industries AG) were in each case mixed with 50 g of the following polyols, polyamines and amino alcohols: a) butanediol, b) ethylenediamine, c) diethanolamine.

The mixtures were then largely freed of water in a short-path evaporator at 70° C. and 0.2 mbar. Clear solutions with no sediment were obtained. The water content was <1% by weight.

2) Preparation of a Polyurethane Dispersion 111 g of IPDI was mixed with 0.1 g of dibutyltin dilaurate (Aldrich), heated to 100° C. and mixed with 16.4 g of product 1a dropwise. After stirring further for 30 min at 100° C., the temperature was cooled to 60° C. and the mixture was carefully diluted with 100 ml of acetone. This was followed by the addition at 60° C. of 88.5 g of Oxyester T1136 (polyester, Evonik Industries AG, OH value: 112 mg KOH/g), 12.3 g of butanediol (Aldrich) and 4.3 g of trimethylolpropane (Aldrich). After heating under reflux for 12 h, the NCO number had fallen to 3.2% (based on solids). The mixture was then cooled, diluted with 120 ml of acetone and mixed with 6 g of ethylenediamine (Aldrich) dissolved in 25 ml of acetone. After stirring for 15 s, 430 ml of water was finally added over 30 s and the mixture was then dispersed further for an additional two minutes at 4400 rpm. The acetone was removed in a rotary evaporator at <60° C. and the resulting white product passed through a 50 μm filter. The polyurethane dispersion had a pH of 8.8 and a solids content of 35% and was of low viscosity and stable.

The invention claimed is:

1. A composition consisting of reactive constituents
a) from 20 to 80% by weight, based on the total mass of constituents of the composition, of at least one sulfonic acid functionalized with at least one hydroxy and/or amino group and/or at least one sulfonic acid derivative functionalized with at least one hydroxy and/or amino group, selected from the group consisting of lithium, sodium, potassium, and caesium salts of a sulfonic acid selected from the group consisting of hydroxyethylsulfonic acid, hydroxypropylsulfonic acid, hydroxybutylsulfonic acid, aminoethylsulfonic acid, aminopropylsulfonic acid, aminobutylsulfonic acid and 2-[(2-aminoethyl)amino-ethane]sulfonic acid; and b) from 80 to 20% by weight, based on the total mass of constituents of the composition, of at least one compound having at least two OH groups, wherein:
component a) is exclusively a sulfonic acid derivative, and
the water content is less than 5% by weight based on the total mass of the composition.

2. The composition according to claim 1, wherein the composition comprises from 0.5 to 5% by weight, based on the total mass of constituents of the composition, of water.

3. The composition according to claim 1, wherein the composition comprises
a) from 35 to 65% by weight of the 2-[(2-aminoethyl)aminoethane]sulfonic acid derivative and
b) from 65 to 35% by weight of at least one compound having at least two OH groups.

4. The composition according to claim 1, wherein the compound having at least two functional groups is a polyol selected from the group consisting of ethylene glycol, propylene glycol, butanediol, propanediol, hexanediol, trimethylolpropane, glycerol, polyether polyols and polycaprolactone polyols.

5. The composition according to claim 1, wherein the weight-average molar mass of component b) is between 62 and 1000 g/mol.

6. A method for preparing a composition according to claim 1, wherein the at least one sulfonic acid or at least one sulfonic acid derivative is mixed with the compound having at least two OH groups.

7. A method of hydrophilization of a binder for aqueous dispersion comprising the composition according to claim 1.

8. The composition according to claim 2, wherein the composition comprises
a) from 35 to 65% by weight of the 2-[(2-aminoethyl)aminoethane]sulfonic acid derivative and
b) from 65 to 35% by weight of at least one compound having at least two OH groups.

9. The composition according to claim 2, wherein the compound having at least two functional groups is a polyol selected from the group consisting of ethylene glycol, propylene glycol, butanediol, propanediol, hexanediol, trimethylolpropane, glycerol, polyether polyols and polycaprolactone polyols.

10. The composition according to claim 2, wherein the reactive constituent b) has a weight-average molar mass of between 62 and 1000 g/mol.

11. The composition according to claim 2, wherein the reactive constituent b) has a weight-average molar mass of between 62 and 1000 g/mol.

12. The composition according to claim 1, comprising a water content of from 1 to 4% by weight.

* * * * *